(12) United States Patent
Kawasaki et al.

(10) Patent No.: US 7,578,626 B2
(45) Date of Patent: Aug. 25, 2009

(54) OPTICAL CONNECTOR KIT

(75) Inventors: Yasunari Kawasaki, Chiba (JP); Akio Tanabe, Tokyo (JP); Tomohiro Akiyama, Tokyo (JP)

(73) Assignee: Seikoh Biken Co., Ltd., Chiba (JP)

( * ) Notice: Subject to any disclaimer, the term of this patent is extended or adjusted under 35 U.S.C. 154(b) by 0 days.

(21) Appl. No.: 12/053,651

(22) Filed: Mar. 24, 2008

(65) Prior Publication Data
US 2008/0279511 A1 Nov. 13, 2008

(30) Foreign Application Priority Data
Apr. 17, 2007 (JP) ............................. 2007-108373

(51) Int. Cl.
*G02B 6/255* (2006.01)
(52) U.S. Cl. ............................. 385/96; 385/85; 385/134
(58) Field of Classification Search .................. 385/85, 385/95–99, 134–137
See application file for complete search history.

(56) References Cited

U.S. PATENT DOCUMENTS

| 6,779,928 B2 * | 8/2004 | Wada et al. ................... 385/85 |
| 2005/0213897 A1 * | 9/2005 | Palmer et al. ................. 385/95 |
| 2008/0181563 A1 * | 7/2008 | Akiyama ..................... 385/96 |

FOREIGN PATENT DOCUMENTS

JP 2005-25132 A 1/2005

* cited by examiner

*Primary Examiner*—Sung H Pak
*Assistant Examiner*—Daniel Petkovsek
(74) *Attorney, Agent, or Firm*—Carlson, Gaskey & Olds

(57) ABSTRACT

An optical connector kit includes a ferrule-with-optical-fiber and an accommodating housing for accommodating all connector parts constituting an optical connector, including the ferrule-with-optical-fiber. An optical fiber having a predetermined length is attached to the ferrule of the ferrule-with-optical-fibers, for which end face polishing processing is carried out. The connector parts include a plurality of connector parts into which another optical fiber is inserted when the rear end of the optical fiber of the ferrule-with-optical-fiber and the tip end of another optical fiber are fusion-spliced. In the accommodating housing, the connector parts are arranged in a line in the order of insertion of another optical fiber.

11 Claims, 17 Drawing Sheets

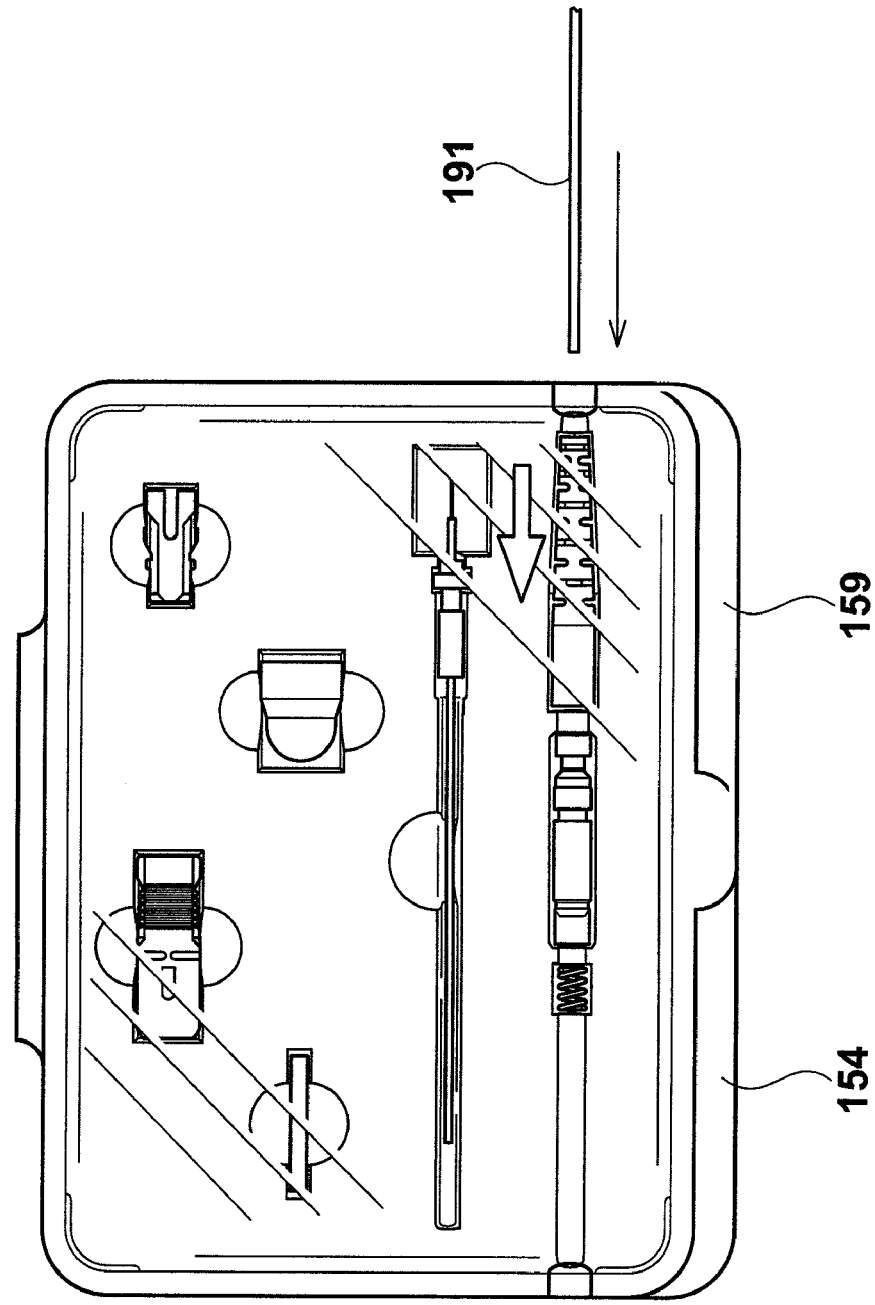

OPTICAL CONNECTOR KIT

CROSS-REFERENCE TO RELATED APPLICATION

This application is based upon and claims the benefit of priority from the prior Japanese Patent Application No. 2007-108373, filed in Japan on Apr. 17, 2007, and the entire contents of which are incorporated herein by reference.

BACKGROUND OF THE INVENTION

1. Field of the Invention

The present invention relates to an optical connector kit including parts constituting an optical connector. The optical connector kit facilitates an attaching operation of an optical connector to the tip end of an optical fiber on a job site.

2. Description of the Related Art

In recent years, it is required to attach an optical connector to the tip end of an optical fiber on a job site more restrictive in workability compared to a manufacturing factory. This operation is to construct an access network, local area optical fiber wiring, etc., using an optical fiber.

In general, the number of parts of an optical connector is large. Therefore, when attaching an optical connector to the tip end of an optical fiber, first, the optical fiber is inserted manually into necessary connector parts one by one.

In this case, however, an error in operations is likely to occur, such as that the optical fiber may not be inserted into some of the necessary connector parts and that the order of connector parts or their directions are different. Particularly, such an error in operations is likely to occur when an attaching operation is performed on a job site. As described above, the operation to insert an optical fiber into necessary connector parts takes much time and labor, and it is inefficient even though it is an easy operation.

Conventionally, a housing that accommodates a plurality of connector parts arranged in a line in a predetermined order has been disclosed in order to solve such circumstances in, for example, Japanese Patent Application Laid-open No. 2005-25132. An optical fiber is first inserted into these connector parts when attaching an optical connector to the tip end of the optical fiber. These connector parts are accommodated in the housing arranged in a line in the order of insertion.

By using such a housing, the error in operations described above becomes more unlikely to occur. That is, the error in operations, such as that an optical fiber may not be inserted into some of the necessary connector parts and that the order of connector parts or their directions are different, becomes more unlikely to occur.

However, the conventional housing mentioned above does not include a ferrule. A ferrule is one of connector parts indispensable when attaching an optical connector to the tip end of an optical fiber. That is, the conventional housing does not necessarily include all the connector parts constituting an optical connector.

When assembling an optical connector, first, an optical fiber is inserted into a plurality of connector parts accommodated in the above housing in the predetermined order. Next, the coating of tip end of the optical fiber is removed. Subsequently, the tip end of the optical fiber is inserted into an insertion hole formed in a ferrule and adhered thereto. Performing this operation on a job site takes much time and labor, and consequently its operability is low.

SUMMARY OF THE INVENTION

In order to solve the above problems, an object of the present invention is to provide an optical connector kit that accommodates a plurality of connector parts to be inserted into an optical fiber arranged in a line in the order of insertion when an optical connector is attached to the tip end of the optical fiber. In addition, the optical connector kit includes all the connector parts, including a ferrule, which constitute an optical connector. Further, an optical fiber having a predetermined length is attached to the ferrule and end face polishing processing has been carried out therefor. That is, the ferrule is included not as a single part but a ferrule-with-optical-fiber assembled integrally together with an optical fiber and for which end face polishing processing has been carried out.

To achieve the above object, a first aspect of the present invention provides an optical connector kit comprising: a ferrule-with-optical-fiber; and an accommodating housing for accommodating all connector parts constituting an optical connector including said ferrule-with-optical-fiber, wherein said ferrule-with-optical-fiber is configured by attaching an optical fiber having a predetermined length to a ferrule in advance and carrying out end face polishing processing and the tip end of another optical fiber is fusion-spliced to the rear end of said optical fiber, said connector parts include a plurality of connector parts into which said another optical fiber is inserted when the rear end of said optical fiber of said ferrule-with-optical-fiber and the tip end of said another optical fiber are fusion-spliced, and in said accommodating housing, said plurality of connector parts are accommodated by being arranged in a line in the order of insertion of said another optical fiber.

A second aspect of the present invention provides an optical connector kit, wherein said ferrule has a capillary and a flange that holds the rear end portion of the capillary, said optical fiber has a bare optical fiber portion from which coating has been removed at its tip end, in said capillary, a first insertion hole is formed on its tip end side, in the first insertion hole, said bare optical fiber portion is accommodated, and on the rear end side that follows said first insertion hole, a second insertion hole is formed and in the second insertion hole, part of a coated optical fiber portion of said optical fiber is accommodated, and the length of said first insertion hole is shorter than the length of said second insertion hole.

A third aspect of the present invention provides an optical connector kit, wherein said accommodating housing has a ferrule-with-optical-fiber accommodating portion for accommodating said ferrule-with-optical-fiber, said ferrule-with-optical-fiber accommodating portion has a ferrule accommodating portion for accommodating said ferrule of said ferrule-with-optical-fiber and an optical fiber protecting portion, and said optical fiber protecting portion forms a space around the projecting portion of said optical fiber projecting from the rear end of said ferrule.

A fourth aspect of the present invention provides an optical connector kit, wherein in said ferrule accommodating portion, said ferrule is accommodated with its tip end facing a side-wall of said accommodating housing; and said accommodating housing has an entry through which a fusion-splice-jig is inserted from the outside of said accommodating housing at the side-wall in the vicinity of said ferrule accommodating portion and said fusion-splice-jig is fitted to the tip end of said ferrule to hold said ferrule-with-optical-fiber at the time of fusion-splicing.

A fifth aspect of the present invention provides an optical connector kit, wherein said accommodating housing has an inserting parts accommodating portion in which said plurality of connector parts are accommodated by being arranged in a line in the order of insertion of said another optical fiber and also has optical fiber entries on both side-walls in the vicinity of both ends of said inserting parts accommodating portion, and into said optical fiber entry, said another optical fiber is inserted from one side of said accommodating housing, inserted through said plurality of connector parts, and projected from the other.

A sixth aspect of the present invention provides an optical connector kit, wherein said accommodating housing is configured by a lower housing and an upper housing linked with each other so that it can open and close, said lower housing has a bottom upheaved from the surrounding side-wall and the side-wall has a flange around its lower portion, said upper housing has a lid upheaved from the surrounding side-wall and the side-wall has a flange around its lower portion, and when both said flanges overlap each other, both said side-walls come into close contact and said accommodating housing is thus maintained in the closed state.

A seventh aspect of the present invention provides an optical connector kit, wherein said lower housing has a tab at part of said flange and said upper housing has a tab at part of said flange, and both said tabs shift and overlap each other when said accommodating housing is closed and serve as a knob when said accommodating housing is opened.

An eighth aspect of the present invention provides an optical connector kit, wherein the height of said bottom of said lower housing and the height of said lid of said upper housing are substantially equal, and in said lower housing, a ferrule-with-optical-fiber accommodating portion for accommodating said ferrule-with-optical-fiber, an inserting parts accommodating portion for accommodating said plurality of connector parts, and an other parts accommodating portion for accommodating other connector parts are formed so that they bulge out downwardly from said bottom.

A ninth aspect of the present invention provides an optical connector kit, wherein said other connector parts to be accommodated in said other parts accommodating portion include a reinforcing sleeve for reinforcing the fusion-spliced portion when the rear end of said optical fiber of said ferrule-with-optical-fiber and the tip end of said another optical fiber are fusion-spliced.

A tenth aspect of the present invention provides an optical connector kit, wherein said bare optical fiber portion of said ferrule-with-optical-fiber is coated with metal or carbon on its outer surface.

An eleventh aspect of the present invention provides an optical connector kit, wherein said accommodating housing has a holing member accommodating portion for accommodating a holding member attached to said ferrule-with-optical-fiber, and said holding member has a ferrule cap into which a ferrule of said ferrule-with-optical-fiber is inserted from its tip end and a traction portion extending from the bottom of said ferrule cap.

BRIEF DESCRIPTION OF THE ACCOMPANYING DRAWINGS

These and other objects and the configuration of this invention will become clearer from the following description of the preferred embodiments, read in connection with the accompanying drawings in which:

FIG. 18 is a plan view showing a state where the accommodating housing in FIG. 17 is closed.

DETAILED DESCRIPTION OF THE INVENTION

Figure 1:
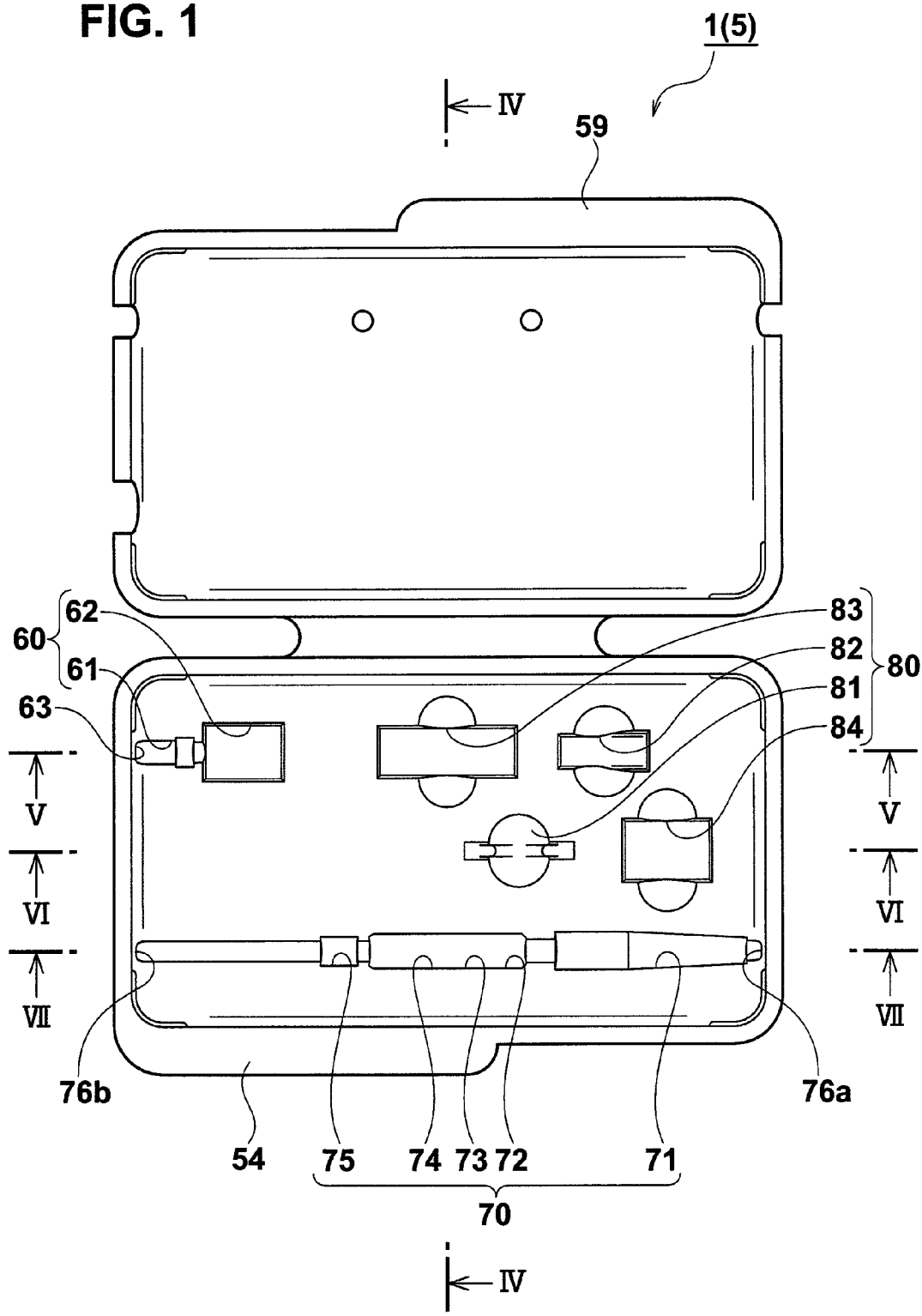
FIG. 1 shows a first embodiment of an optical connector kit according to the present invention, and is a plan view showing a state where an empty accommodating housing that does not accommodate any connector part is open.
Figure 2:
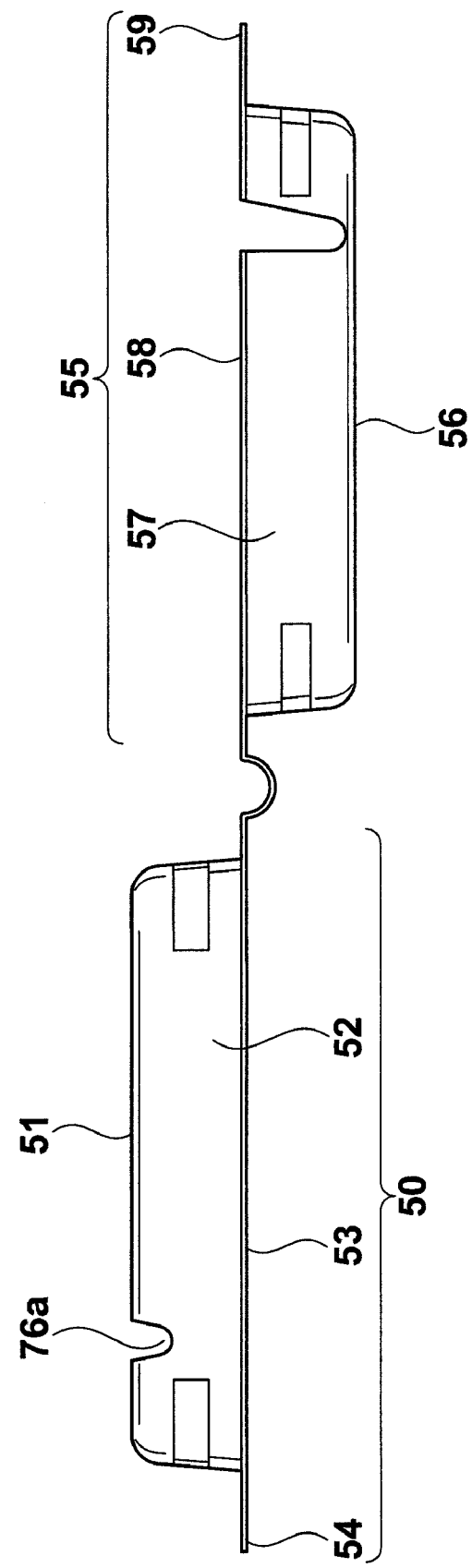
FIG. 2 is a right-side view of the accommodating housing in FIG. 1.
Figure 3:
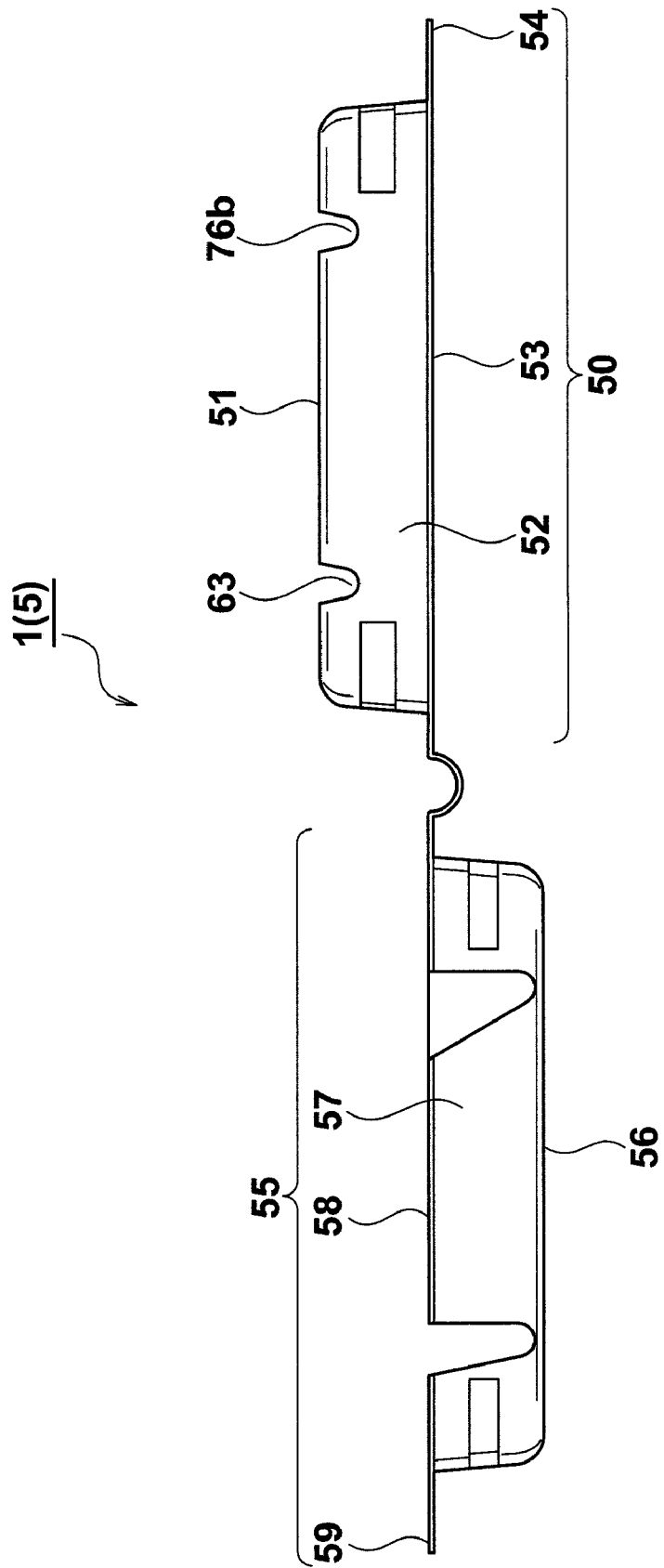
FIG. 3 is a left-side view of the accommodating housing in FIG. 1.
Figure 4:
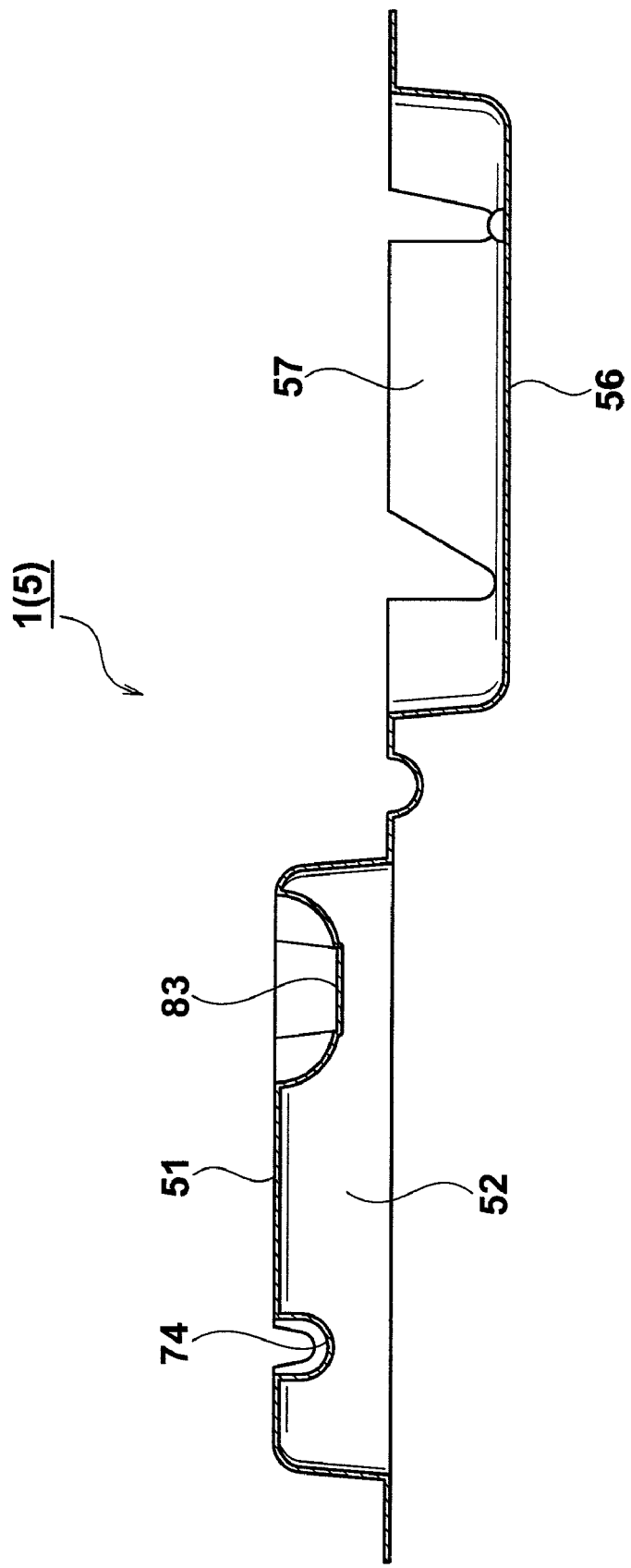
FIG. 4 is a sectional view taken along a line IV-IV of the accommodating housing in FIG. 1.
Figure 5:
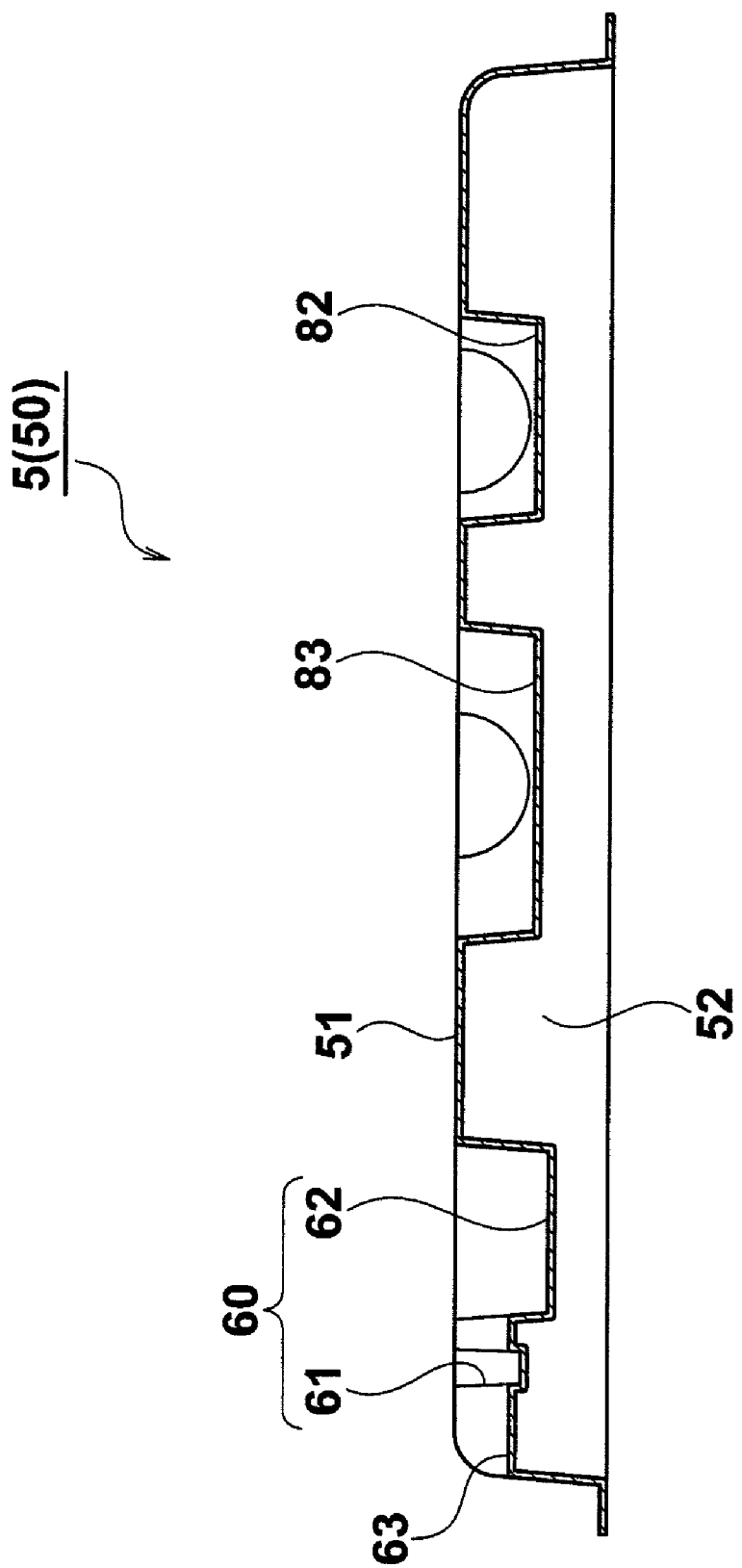
FIG. 5 is a sectional view taken along a line V-V of the accommodating housing in FIG. 1.
Figure 6:
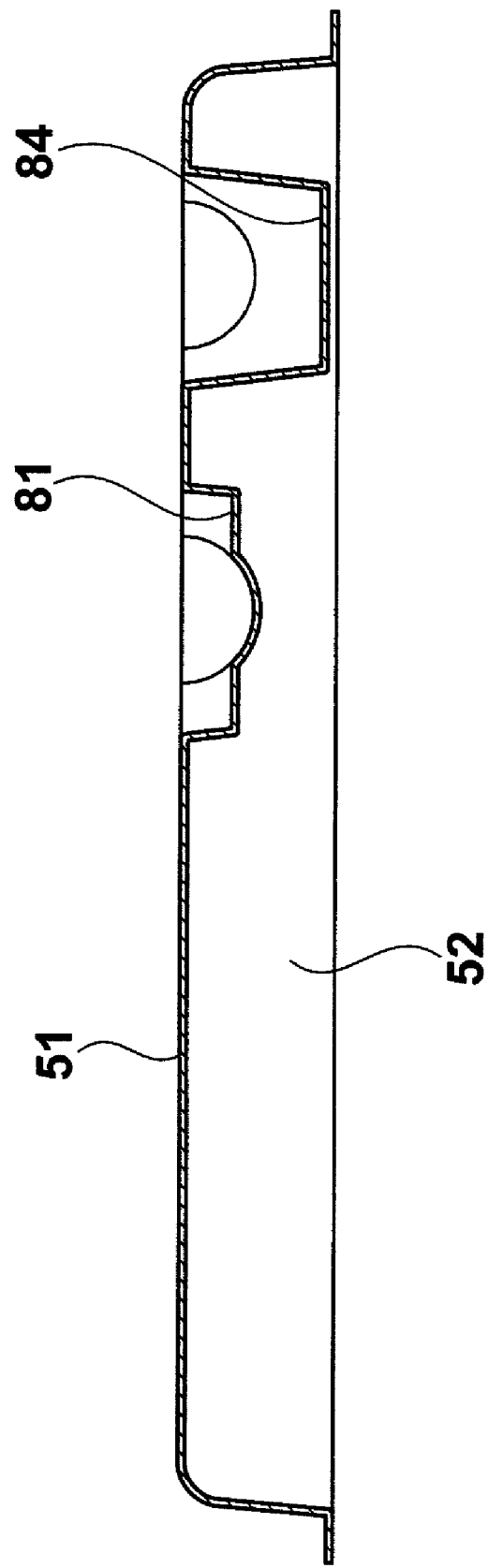
FIG. 6 is a sectional view taken along a line VI-VI of the accommodating housing in FIG. 1.
Figure 7:
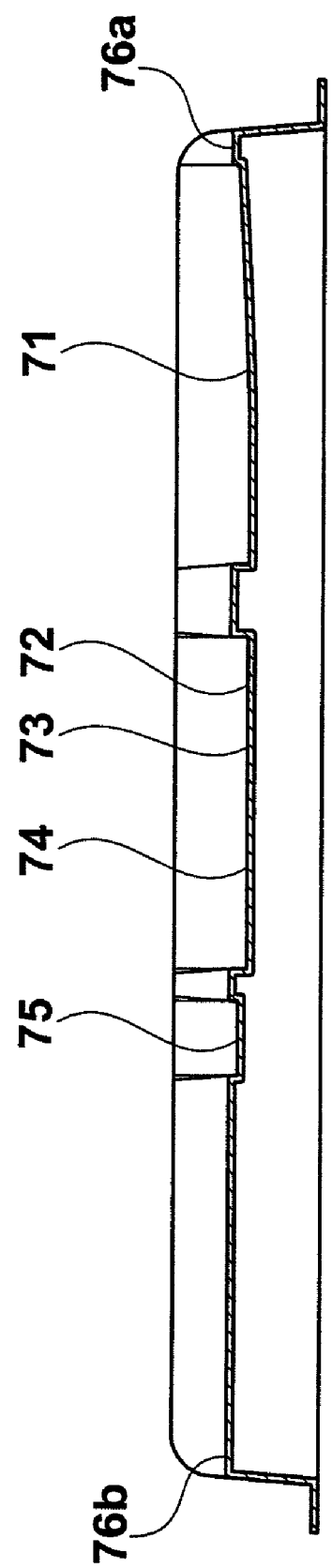
FIG. 7 is a sectional view taken along a line VII-VII of the accommodating housing in FIG. 1.
Figure 8:
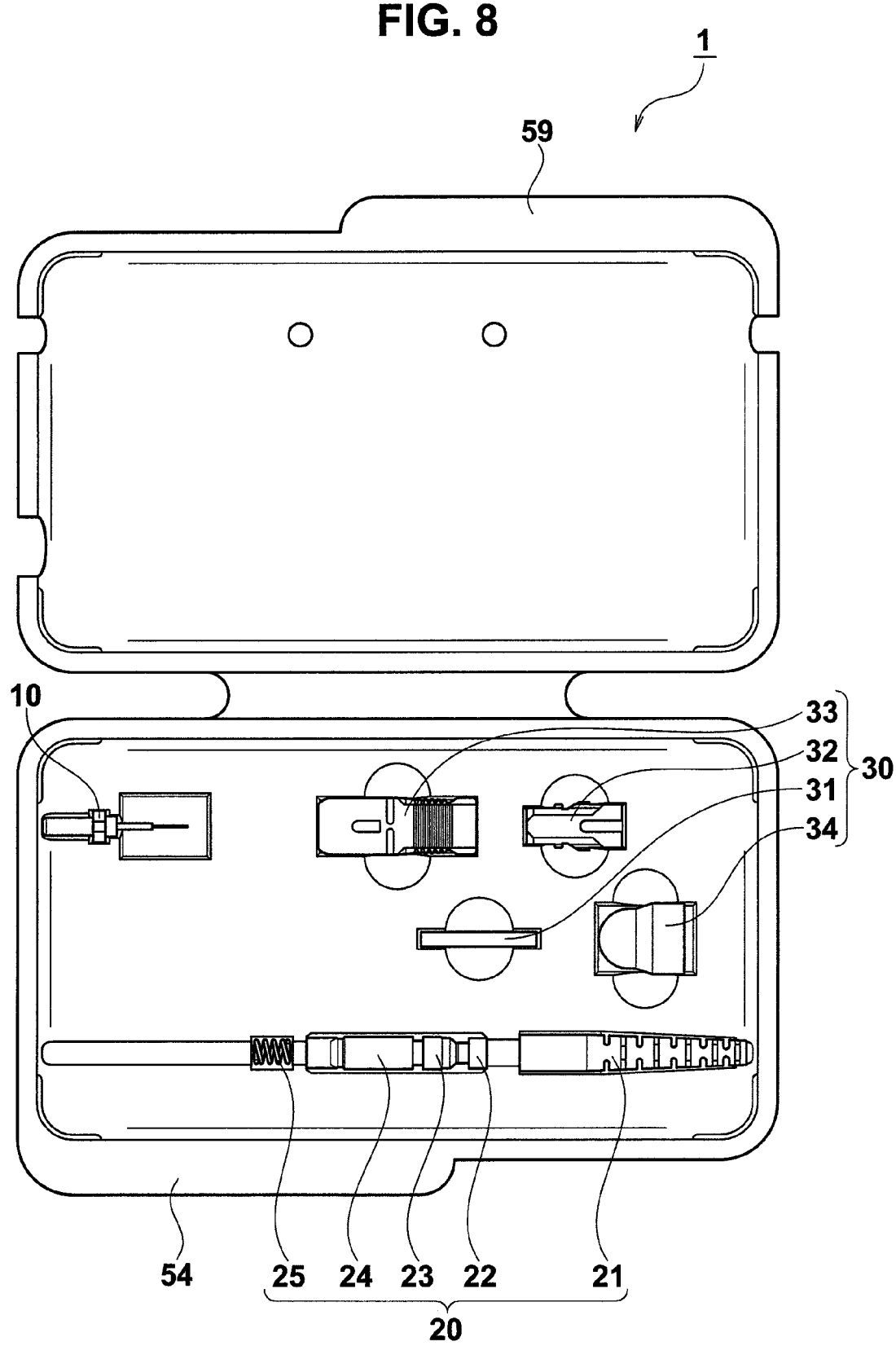
FIG. 8 is a plan view showing a state where all the connector parts are accommodated in the accommodating housing in FIG. 1.
Figure 9:
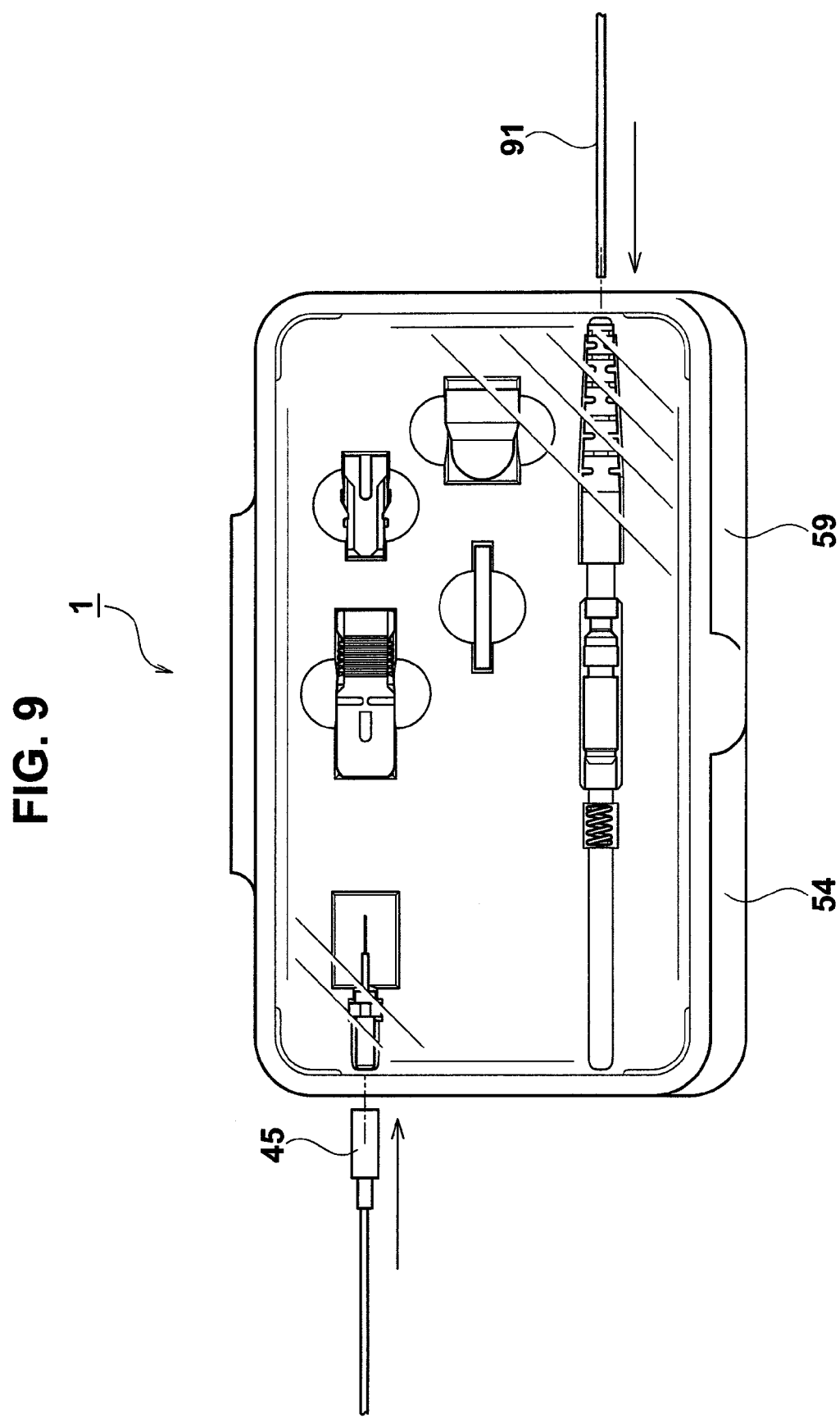
FIG. 9 is a plan view showing a state where the accommodating housing in FIG. 8 is closed.
Figure 10:
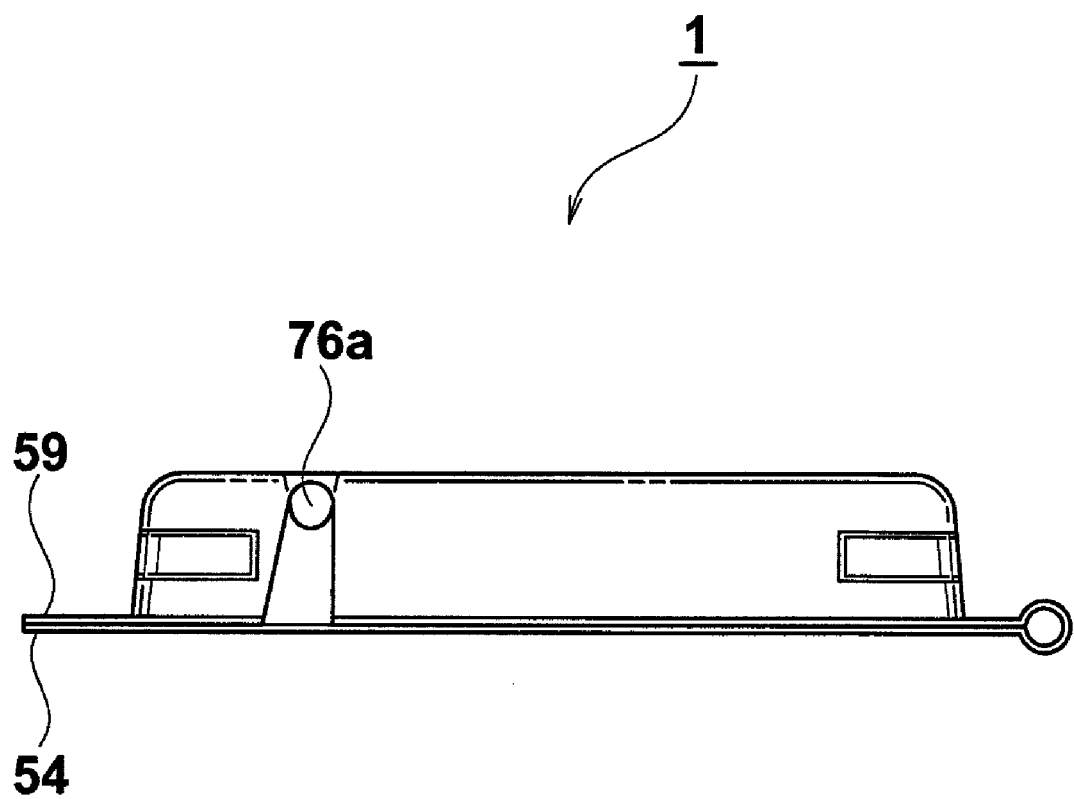
FIG. 10 is a right-side view of the accommodating housing in FIG. 9.

FIG. 1 to FIG. 10 show an optical connector kit according to a first embodiment of the present invention. FIG. 1 is a plan view showing a state where an empty accommodating housing that does not accommodate any connector part is open. FIG. 8 is a plan view showing a state where an accommodating housing that accommodates all the connector parts is open. FIG. 9 is a plan view showing a state where an accommodating housing that accommodates all the connector parts is closed.

In an optical connector kit 1, all the connector parts necessary to constitute an optical connector, including a ferrule-with-optical-fiber 10, are accommodated in an accommodating housing 5. In the ferrule-with-optical-fiber 10, a short-length optical fiber is attached to the ferrule and end face polishing processing has been carried out.

Figure 11:
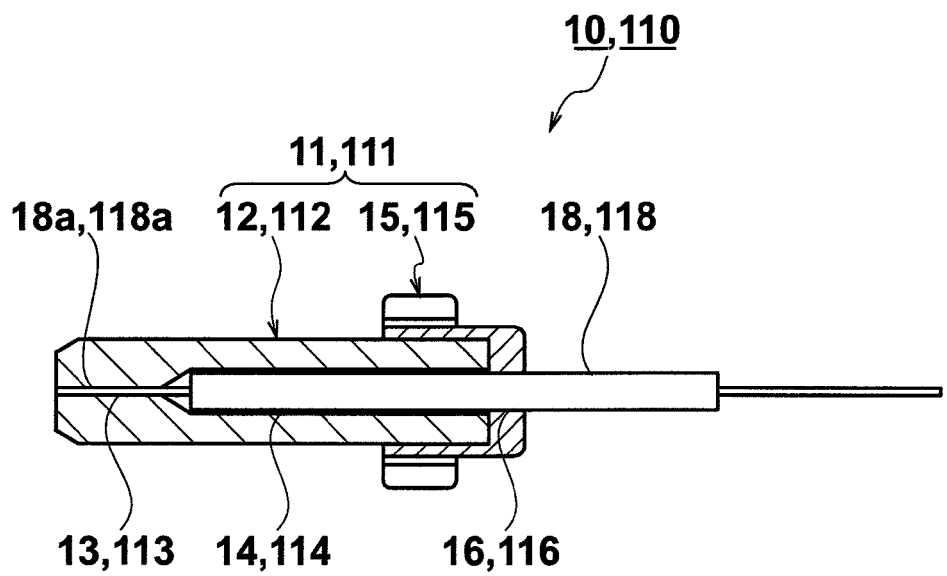
FIG. 11 is a sectional view showing a first embodiment of a ferrule-with-optical-fiber used in an optical connector kit.

As shown in FIG. 11, the ferrule-with-optical-fiber 10 is composed of a ferrule 11 and an optical fiber having a predetermined length (short-length optical fiber) 18. The ferrule 11 includes a capillary 12 and a flange 15 that holds the rear end portion of the capillary 12. The short-length optical fiber 18 has a bare optical fiber portion 18a from which the coating has been removed at its tip end.

In the capillary 12, a first insertion hole 13 that accommodates the bare optical fiber portion 18a of the short-length optical fiber 18 is formed. In addition, in the capillary 12, a second insertion hole 14 that accommodates part of a coated optical fiber portion 18b (see FIG. 12) of the short-length optical fiber 18 is formed. The bare optical fiber portion 18a is connected to the tip end of the coated optical fiber portion 18b. The first insertion hole 13 is formed on the front side of the capillary 12 and the second insertion hole 14 is formed on the behind side of the capillary 12. Further, the length of the first insertion hole 13 is shorter than that of the second insertion hole 14.

In the flange 15, a third insertion hole 16 is formed. The third insertion hole 16 lets a very short part of the coated optical fiber portion 18b of the short-length optical fiber 18 pass therethrough. The very short part is connected to the rear of the part of the coated optical fiber portion 18b to be accommodated in the second insertion hole 14.

The short-length optical fiber 18 has a projecting portion 18c. The projecting portion 18c projects a predetermined length backward from the third insertion hole 16 of the flange 15 when the bare optical fiber portion 18a and part of the coated optical fiber portion 18b are accommodated in the first and second insertion holes 13 and 14 of the capillary 12, respectively.

The projecting portion 18c has at least a length required by a fusion splicing device when its rear end and the tip end of another optical fiber 91 (see FIG. 9) are fusion-spliced.

Figure 12:
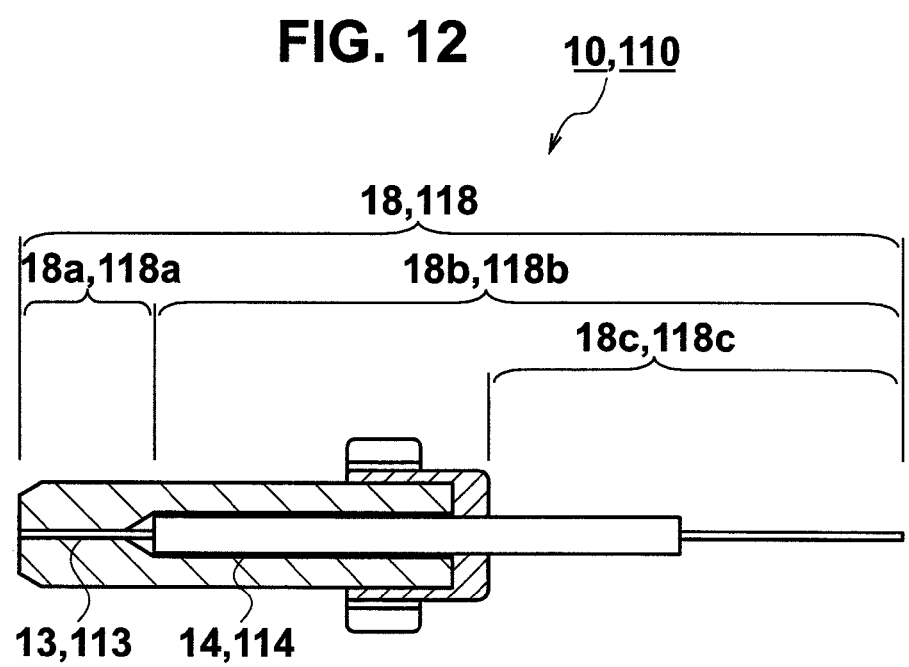
FIG. 12 is a sectional view showing a length of each part of a short-length optical fiber used for the ferrule-with-optical-fiber in FIG. 11.

The projecting portion 18c of the short-length optical fiber 18 may be in the state of the coated optical fiber portion 18b. It is preferable, however, that the coating at the rear end portion of the projecting portion 18c of the short-length optical fiber 18 be removed as shown in FIG. 12.

It is desirable that hermetic coating using a metal or carbon, such as metal coating and carbon coating, be applied to the outer surface of the bare optical fiber portion 18a of the short-length optical fiber 18. The short-length optical fiber 18 is stored under normal temperature and humidity for a long term by being accommodated in the optical connector kit 1. The desirable application is to improve the static fatigue characteristic as countermeasures against degradation in strength.

Connector parts constituting an optical connector include a plurality of connector parts (inserting parts) 20 in addition to such a ferrule-with-optical-fiber 10. The optical fiber 91 is inserted in advance into the connector parts (inserting parts) 20 before the rear end of the short-length optical fiber 18 and the tip end of the optical fiber 91 are fusion-spliced. As shown in FIG. 8, the connector parts (inserting parts) 20 include a boot 21, a sleeve 22, an adaptor 23, a stop ring 24, and a spring 25.

The connector parts constituting an optical connector further include other connector parts (other parts) 30. The other connector parts (other parts) 30 include, as shown in FIG. 8, a reinforcing sleeve 31, a plug frame 32, a holder 33, and a cap 34.

The reinforcing sleeve 31 reinforces the fusion-spliced portion when the rear end of the short-length optical fiber 18 and the tip end of the optical fiber 91 are fusion-spliced. Therefore, the reinforcing sleeve 31 is composed of a thermally contractile tube. The thermally contractile tube internally includes a reinforcing member, such as a metal, and a thermoplastic resin.

As shown in FIG. 1 to FIG. 7, the accommodating housing 5 is constructed by a lower housing 50 and an upper housing 55 linked with each other so that it can open and close. The lower housing 50 has a bottom 51 upheaved from a surrounding side-wall 52. The upper housing 55 has a lid 56 upheaved from a surrounding side-wall 57.

The lower housing 50 has a flange 53 around the lower portion of the side-wall 52. The upper housing 55 has a flange 58 around the lower portion of the side-wall 57. The accommodating housing 5 is closed until the undersurface of the flange 58 of the upper housing 55 overlaps the top surface of the flange 53 of the lower housing 50. In this case, the side-wall 52 of the lower housing 50 and the side-wall 57 of the upper housing 55 come into close contact with each other and thus the closed state of the accommodating housing 5 is maintained. This closed state is not a hermetically sealed state.

The lower housing 50 has a tab 54 at part of the flange 53. The upper housing 55 has a tab 59 at part of the flange 58. The tabs 54 and 59 shift and overlap each other when the accommodating housing 5 is closed. Therefore, the tabs 54 and 59 serve as a knob when the accommodating housing 5 is opened.

The height of the bottom 51 from the flange 53 of the lower housing 50 is substantially the same as the height of the lid 56 from the flange 58 of the upper housing 55.

On the bottom 51 of the lower housing 50, a ferrule-with-optical-fiber accommodating portion 60 is formed so that it bulges out downwardly. In the ferrule-with-optical-fiber accommodating portion 60, the ferrule-with-optical-fiber 10 is accommodated.

On the bottom 51 of the lower housing 50, an inserting parts accommodating portion 70 is formed so that it bulges out downwardly. In the inserting parts accommodating portion 70, the plurality of the connector parts (inserting parts) 20 into which the optical fiber 91 is inserted in advance before fusion splicing are arranged in a line in the order of insertion.

On the bottom 51 of the lower housing 50, an other parts accommodating portion 80 is formed so that it bulges out downwardly. In the other parts accommodating portion 80, the other connector parts (other parts) 30 are accommodated.

The ferrule-with-optical-fiber accommodating portion 60 has a ferrule accommodating portion 61 and an optical fiber protecting portion 62. In the ferrule accommodating portion 61, the ferrule 11 of the ferrule-with-optical-fiber 10 is accommodated. In this case, the optical fiber protecting portion 62 forms a space around the projecting portion 18c projecting from the rear end of the ferrule 11. Therefore, the optical fiber protecting portion 62 protects the projecting portion 18c by means of the space.

In the ferrule-with-optical-fiber accommodating portion 60, the ferrule-with-optical-fiber 10 is accommodated with the tip end of the ferrule 11 being directed toward the vicinity of the side-wall of the accommodating housing 5. The side-wall of the accommodating housing 5 in the vicinity of the ferrule-with-optical-fiber accommodating portion 60 has an entry 63. Through the entry 63, a fusion-splice-jig 45 that holds the ferrule-with-optical-fiber 10 is inserted from the outside of the accommodating housing 5 at the time of fusion splicing. The inserted fusion-splice-jig 45 is fitted to the tip end of the ferrule 11.

The inserting parts accommodating portion 70 has a boot accommodating portion 71, a sleeve accommodating portion 72, an adaptor accommodating portion 73, a stop ring accommodating portion 74, and a spring accommodating portion 75. In the boot accommodating portion 71, the boot 21 is accommodated. In the sleeve accommodating portion 72, the sleeve 22 is accommodated. In the adaptor accommodating portion 73, the adaptor 23 is accommodated. In the stop ring accommodating portion 74, the stop ring 24 is accommodated. In the spring accommodating portion 75, the spring 25 is accommodated.

The accommodating housing 5 has optical fiber entries 76a and 76b on both the side-walls of the accommodating housing 5 on an extension line of the inserting parts accommodating portion 70. Into the optical fiber entry 76a, the optical fiber 91 is put from the outside of the accommodating housing 5. The optical fiber 91 is inserted into the connector parts (inserting parts) 20 arranged in a line (the boot 21, the sleeve 22, the adaptor 23, the stop ring 24, the spring 25). The optical fiber 91 is then put out to the outside of the accommodating housing 5 from the optical fiber entry 76b.

The other parts accommodating portion 80 has a reinforcing sleeve accommodating portion 81, a plug frame accommodating portion 82, a holder accommodating portion 83, and a cap accommodating portion 84. In the reinforcing sleeve accommodating portion 81, the reinforcing sleeve 31 is accommodated. In the plug frame accommodating portion 82, the plug frame 32 is accommodated. In the holder accommodating portion 83, the holder 33 is accommodated. In the cap accommodating portion 84, the cap 34 is accommodated.

Such an accommodating housing 5 can be molded using an appropriate synthetic resin, such as a polyethylene terephthalate (PET) resin. For example, if a transparent resin is used, all the connector parts 10, 20, and 30 can be confirmed from the outside. It is not necessary to open the accommodating housing 5 in the order to confirm the accommodated parts.

Next, a method of assembling an optical connector using the optical connector kit 1 is explained.

In the ferrule-with-optical-fiber accommodating portion 60 of the optical connector kit 1, the ferrule-with-optical-fiber 10 is accommodated. In the inserting parts accommodating portion 70 of the optical connector kit 1, the connector parts (inserting parts) 20 (the boot 21, the sleeve 21, the adaptor 23, the stop ring 24, the spring 25) are accommodated. In the other parts accommodating portion 80 of the optical connector kit 1, the connector parts (other parts) 30 (the reinforcing sleeve 31, the plug frame 32, the holder 33, the cap 34) are accommodated.

The accommodating housing 5 is closed until the undersurface of the flange 58 of the upper housing 55 overlaps the top surface of the flange 53 of the loser housing 50. In this case, the accommodating portion 5 is maintained in the closed state by the side-wall 52 of the lower housing 50 and the side-wall 57 of the upper housing 55 coming into close contact with each other.

At first, the accommodating housing 5 is in such a closed state. In this closed state, the optical fiber 91 is inserted into the inside of the accommodating housing 5 from the optical fiber entry 76a in the vicinity of the rear end of the boot 21. After this, the optical fiber 91 is caused to project to the outside of the accommodating housing 5 from the optical fiber entry 76b on the opposite side. Due to this, the optical fiber 91 is inserted into the connector parts (inserting parts) 20 accommodated in the accommodating housing 5 by being arranged in a line in the order of the arrangement (in the order of the boot 21, the sleeve 22, the adaptor 23, the stop ring 24, and the spring 25).

On the other hand, in the closed state of the accommodating housing 5, the fusion-splice-jig 45 is inserted into the inside of the accommodating housing 5 from the entry 63. The fusion-splice-jig 45 is then fitted to the tip end of the ferrule 11 of the ferrule-with-optical-fiber 10. Due to this, the ferrule-with-optical-fiber 10 is held by the fusion-splice-jig 45.

Next, the accommodating housing 5 is opened by putting a finger on the tabs 54 and 59 of the accommodating housing 5. The ferrule-with-optical-fiber 10 held by the fusion-splice-jig 45 is then taken out. The rear end of the short-length optical fiber 18 of the ferrule-with-optical-fiber 10 and the tip end of the optical fiber 91 are then fusion-spliced.

The fusion splicing is carried out as follows. First, the coating of the portion having the predetermined length at the rear end of the projecting portion 18c of the short-length optical fiber 18 is removed. Similarly, the coating of the portion having the predetermined length at the tip end of the optical fiber 91 is removed. Next, the rear end of the short-length optical fiber 18 and the tip end of the optical fiber 91 are arranged in opposition to each other and their centers are aligned on the basis of the position of the core or clad. After this, fusion splicing is carried out.

At this time, it is preferable to remove in advance the coating of the rear end portion of the projecting portion 18c of the short-length optical fiber 18. This is because if the coating of the rear end portion of the projecting portion 18c is removed in advance, it is possible to reduce the working time by saving a period of time required to remove the coating.

The reinforcing sleeve 31 is attached to the fusion-spliced portion for reinforcement. The coated portion of the optical fiber 91 is inserted in advance into the reinforcing sleeve 31 before fusion splicing. Because the reinforcing sleeve 31 internally includes a reinforcing member, such as a metal, and a thermoplastic resin, it is possible to sufficiently reinforce the fusion-spliced portion.

Figure 13:
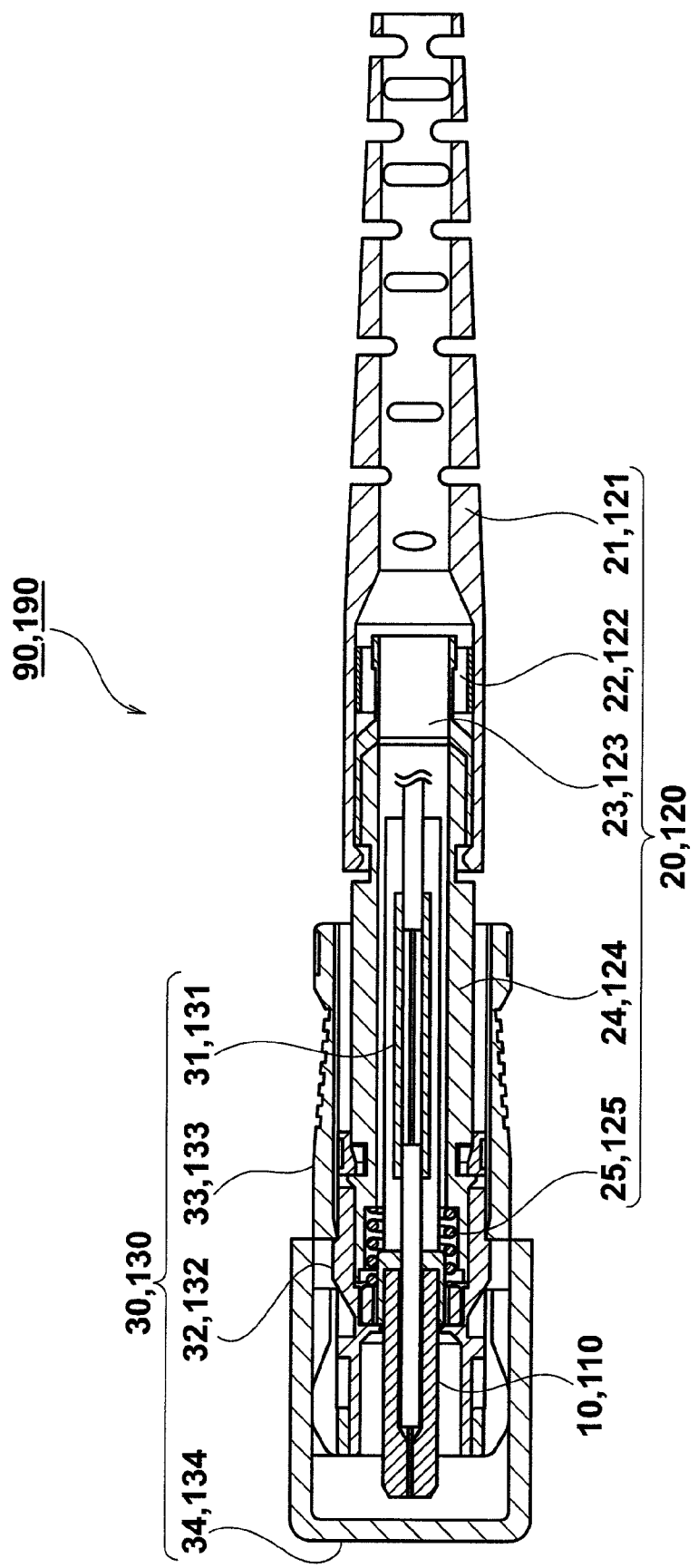
FIG. 13 is a sectional view showing a first embodiment of an optical connector in which the optical connector kit has been assembled.

After that, the connector parts (inserting parts) 20 (the boot 21, the sleeve 22, the adaptor 23, the stop ring 24, the spring 25) into which the optical fiber 91 is inserted are assembled. Further, the connector parts (other parts) 30 (the plug frame 32, the holder 33, the cap 34) except for the reinforcing sleeve 31 are assembled. By assembling according to a predetermined assembling order, an optical connector 90 can be obtained as shown in FIG. 13.

Figure 14:
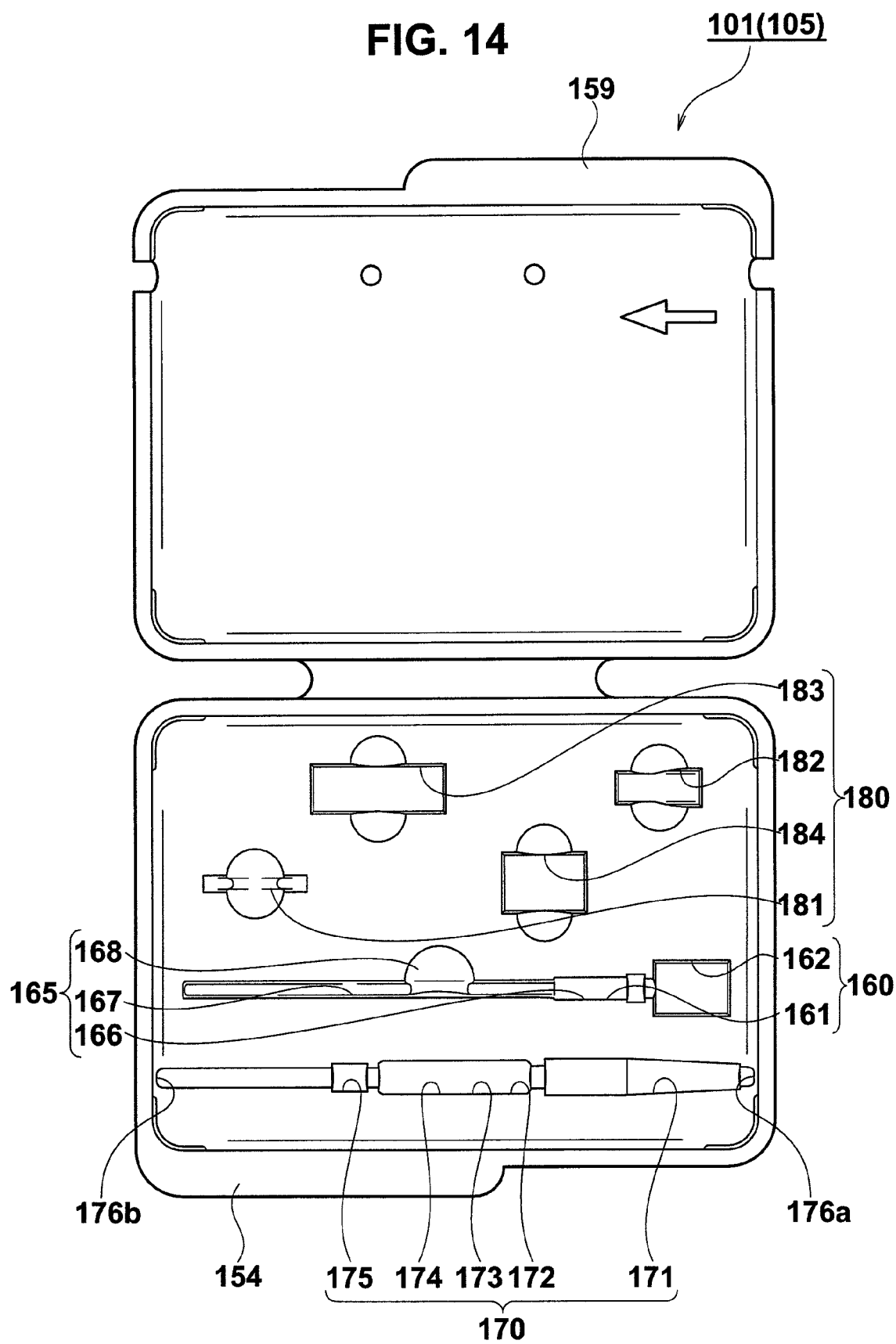
FIG. 14 shows an optical connector kit according to a second embodiment of the present invention, and is a plan view showing a state where an empty accommodating housing that does not accommodate any connector part is open.
Figure 15:
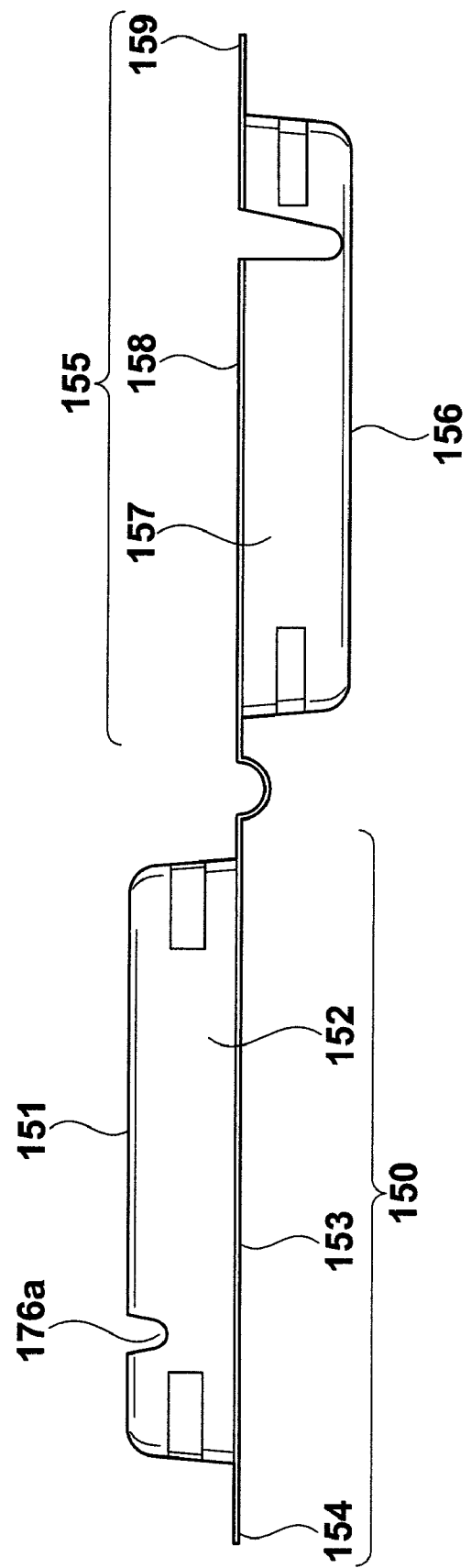
FIG. 15 is a right-side view of the accommodating housing in FIG. 14.
Figure 16:
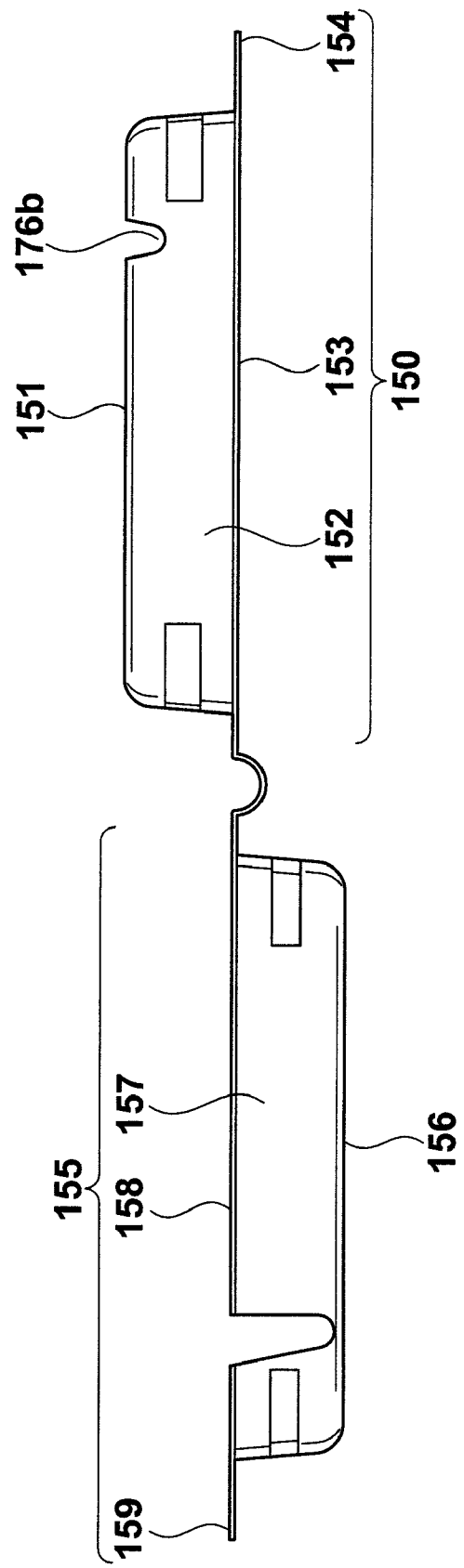
FIG. 16 is a left-side view of the accommodating housing in FIG. 14.
Figure 17:
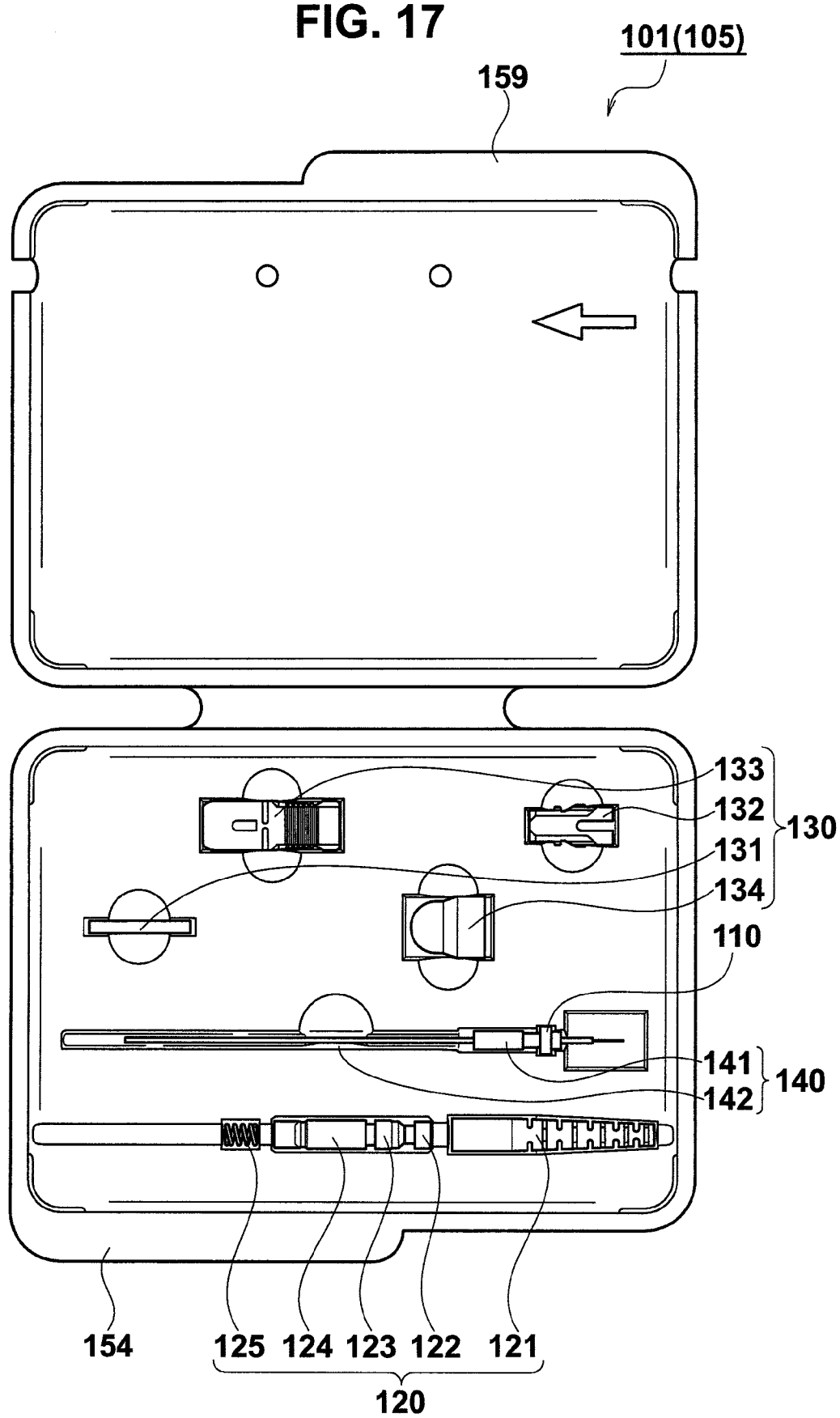
FIG. 17 is a plan view showing a state where all the connector parts are accommodated in the accommodating housing in FIG. 14.

FIG. 14 to FIG. 18 show an optical connector kit according to a second embodiment of the present invention. FIG. 14 is a plan view showing a state where an empty accommodating housing that does not accommodate any connector part is open. FIG. 17 is a plan view showing a state where an accommodating housing that accommodates all the connector parts is open. FIG. 18 is a plan view showing a state where the accommodating housing that accommodates all the connector parts is closed.

An optical connector kit 101 is identical to the optical connector kit 1 according to the first embodiment. Therefore, like parts are denoted by like reference numerals used in FIG. 1 to FIG. 10 with 100 added thereto, and redundant explanations thereof will be omitted.

In an accommodating housing 105 of the optical connector kit 101, a ferrule-with-optical-fiber 110, inserting parts 20, and other parts 130 are accommodated. In the accommodating housing 105, a holding member 140 that holds the ferrule-with-optical-fiber 110 at the time of fusion splicing is also accommodated.

The holding member 140 has a ferrule cap 141 and a traction portion 142 extending from the bottom of the ferrule cap 141. Into the ferrule cap 141, a ferrule 111 of the ferrule-with-optical-fiber 110 is inserted from its tip end. The ferrule 111 is inserted into the ferrule cap 141 and then the holding member 140 is integrated with the ferrule-with-optical-fiber 110 into a single unit.

On a bottom 151 of a lower housing 150, a holding member accommodating portion 165 is formed so that it bulges out downwardly. In the holding member accommodating portion 165, the holding member 140 attached to the ferrule-with-optical-fiber 110 is accommodated.

The holding member accommodating portion 165 has a ferrule cap accommodating portion 166 and a traction portion accommodating portion 167. In the ferrule cap accommodating portion 166, the ferrule cap 141 of the holding member 140 attached to the ferrule-with-optical-fiber 110 is accommodated. In the traction portion accommodating portion 167, the traction portion 142 extending from the bottom of the ferrule cap 141 is accommodated.

The holding member accommodating portion 165 has a finger holing portion 168 for holing a finger on the holding member 140. By inserting a finger into the finger holing portion 168, the traction portion 142 of the holding member 140 can be lifted up. Due to this, the holding member 140 and the ferrule-with-optical-fiber 110 integrated thereto into one unit are taken out from the accommodating housing 105.

Next, a method of assembling an optical connector using the optical connector kit 101 is explained.

At first, the accommodating housing 105 is in the closed state. In this closed state, an optical fiber 191 is inserted into the inside of the accommodating housing 105 through an optical fiber entry 176a in the vicinity of the rear end of a boot 121. Subsequently, the optical fiber 191 is caused to project to the outside of the accommodating housing 105 from an optical fiber entry 176b on the opposite side. Due to this, the optical fiber 191 is inserted into the connector parts (inserting parts) 120 accommodated in the accommodating housing 105 by being arranged in a liner in the order of the arrangement (the boot 121, a sleeve 122, an adaptor 123, a stop ring 124, and a spring 125).

Next, the accommodating housing 105 is opened by putting a finger on tabs 154 and 159 of the accommodating housing 105. The ferrule-with-optical-fiber 110 integrated with the holing member 140 into one unit is then taken out. The rear end of the short-length optical fiber 118 of the ferrule-with-optical-fiber 110 and the tip end of the optical fiber 191 are then fusion-spliced.

A reinforcing sleeve 131 is attached to the fusion-spliced portion for enforcement. The coated portion of the optical fiber 91 is inserted in advance into the reinforcing sleeve 31 before fusion splicing.

After that, the inserting parts 120 (the boot 121, the sleeve 122, the adaptor 123, the stop ring 124, the spring 125) into which the optical fiber 191 is inserted are assembled. In addition, other parts 130 (a plug frame 132, a holder 133, a cap 134) except for the reinforcing sleeve 131 are assembled. By assembling according to a predetermined assembling order, an optical connector 190 can be obtained as shown in FIG. 13.

As described above, the optical connector kit of the present invention is explained specifically together with the method of assembling an optical connector using the same. However, the present invention is not limited to the above embodiments and there can be various modifications in design. For example, it is possible to adopt the conventionally known mechanisms (not shown), such as the hinge system and the fit-in system for the opening/closing mechanism of the lower housings 50 and 150 and the upper housings 55 and 155. In addition, while the above embodiments are explained with an example of SC type connector parts, the present invention can be also applied to connector parts of MU type, FC type, ST type, or the like.

According to the present invention, it is easy to insert another optical fiber into a plurality of connector parts on a job site.

Further, it is also easy to fusion-splice the tip end of another optical fiber to the rear end of the optical fiber of the ferrule-with-optical-fiber on a job site.

Furthermore, it is convenient to carry all the connector parts constituting an optical connector to a job site. Therefore, there is no possibility of forgetting to carry a part of the connector parts constituting an optical connector.

What is claimed is:

1. An optical connector kit comprising:
   a ferrule-with-optical-fiber for which end face polishing processing is carried out; and
   an accommodating housing for accommodating all connector parts constituting an optical connector including said ferrule-with-optical-fiber, wherein
   said ferrule-with-optical-fiber includes a ferrule, and a first optical fiber having a predetermined length attached to said ferrule,
   said connector parts include a plurality of connector parts into which a second optical fiber is inserted when the rear end of said first optical fiber of said ferrule-with-optical-fiber and the tip end of said second optical fiber are fusion-spliced, and
   in said accommodating housing, said plurality of connector parts are accommodated by being arranged in a line in the order of insertion of said second optical fiber.

2. The optical connector kit according to claim 1, wherein
   said ferrule has a capillary and a flange that holds the rear end portion of the capillary,
   said first optical fiber has a bare optical fiber portion from which coating has been removed at its tip end,
   in said capillary, a first insertion hole is formed on its tip end side, in the first insertion hole, said bare optical fiber portion is accommodated, and on the rear end side that follows said first insertion hole, a second insertion hole is formed and in the second insertion hole, part of a coated optical fiber portion of said first optical fiber is accommodated, and
   the length of said first insertion hole is shorter than the length of said second insertion hole.

3. The optical connector kit according to claim 2, wherein
   said accommodating housing has a ferrule-with-optical-fiber accommodating portion for accommodating said ferrule-with-optical-fiber,
   said ferrule-with-optical-fiber accommodating portion has a ferrule accommodating portion for accommodating said ferrule of said ferrule-with-optical-fiber and an optical fiber protecting portion, and
   said optical fiber protecting portion forms a space around the projecting portion of said first optical fiber projecting from the rear end of said ferrule.

4. The optical connector kit according to claim 3, wherein
   in said ferrule accommodating portion, said ferrule is accommodated with its tip end facing a side-wall of said accommodating housing; and
   said accommodating housing has an entry through which a fusion-splice-jig is inserted from the outside of said accommodating housing at the side-wall in the vicinity of said ferrule accommodating portion and said fusion-splice-jig is fitted to the tip end of said ferrule to hold said ferrule-with-optical-fiber at the time of fusion-splicing.

5. The optical connector kit according to claim 4, wherein
   said accommodating housing has an inserting parts accommodating portion in which said plurality of connector parts are accommodated by being arranged in a line in the order of insertion of said second optical fiber and also has optical fiber entries on both side-walls in the vicinity of both ends of said inserting parts accommodating portion, and
   into said optical fiber entry, said second optical fiber is inserted from one side of said accommodating housing, inserted through said plurality of connector parts, and projected from the other.

6. The optical connector kit according to claim 5, wherein
   said accommodating housing is configured by a lower housing and an upper housing linked with each other so that it can open and close, said lower housing has a bottom upheaved from the surrounding side-wall and the side-wall has a flange around its lower portion, said upper housing has a lid upheaved from the surrounding side-wall and the side-wall has a flange around its lower portion, and when both said flanges overlap each other, both said side-walls come into close contact and said accommodating housing is thus maintained in the closed state.

7. The optical connector kit according to claim 6, wherein said lower housing has a tab at part of said flange and said upper housing has a tab at part of said flange, and both said tabs shift and overlap each other when said accommodating housing is closed and serve as a knob when said accommodating housing is opened.

8. The optical connector kit according to claim 7, wherein the height of said bottom of said lower housing and the height of said lid of said upper housing are substantially equal, and in said lower housing, a ferrule-with-optical-fiber accommodating portion for accommodating said ferrule-with-optical-fiber, an inserting parts accommodating portion for accommodating said plurality of connector parts, and an other parts accommodating portion for accommodating other connector parts are formed so that they bulge out downwardly from said bottom.

9. The optical connector kit according to claim 8, wherein said other connector parts to be accommodated in said other parts accommodating portion include a reinforcing sleeve for reinforcing the fusion-spliced portion when the rear end of said first optical fiber of said ferrule-with-optical-fiber and the tip end of said second optical fiber are fusion-spliced.

10. The optical connector kit according to claim 9, wherein said bare optical fiber portion of said ferrule-with-optical-fiber is coated with metal or carbon on its outer surface.

11. The optical connector kit according to claim 3, wherein said accommodating housing has a holding member accommodating portion for accommodating a holding member attached to said ferrule-with-optical-fiber, and said holding member has a ferrule cap into which a ferrule of said ferrule-with-optical-fiber is inserted from its tip end and a traction portion extending from the bottom of said ferrule cap.

\* \* \* \* \*

UNITED STATES PATENT AND TRADEMARK OFFICE
CERTIFICATE OF CORRECTION

PATENT NO. : 7,578,626 B2  Page 1 of 1
APPLICATION NO. : 12/053651
DATED : August 25, 2009
INVENTOR(S) : Kawasaki et al.

It is certified that error appears in the above-identified patent and that said Letters Patent is hereby corrected as shown below:

On the Title Page:

The two Assignee's should read as follows:

(73) Assignees: Seikoh Giken Co., Ltd., Chiba (JP)
The Furukawa Electric Co., Ltd., Tokyo (JP)

Signed and Sealed this

Sixteenth Day of March, 2010

David J. Kappos
*Director of the United States Patent and Trademark Office*